United States Patent [19]

Wheeler

[11] Patent Number: 4,691,430

[45] Date of Patent: Sep. 8, 1987

[54] METHOD AND MEANS FOR SEALING ELECTRICAL CONDUCTOR RODS IN A TUBULAR HOUSING

[75] Inventor: Dale E. Wheeler, Claremore, Okla.

[73] Assignee: Hughes Tool Company, Houston, Tex.

[21] Appl. No.: 809,355

[22] Filed: Dec. 16, 1985

[51] Int. Cl.[4] ............ B23P 11/02

[52] U.S. Cl. ............ 29/451; 29/881; 439/275; 439/736

[58] Field of Search ............ 29/451, 881, 235; 339/94, 218, 60, 28, 29

[56] References Cited

U.S. PATENT DOCUMENTS

| | | | |
|---|---|---|---|
| 3,721,943 | 3/1973 | Curr | 339/94 M |
| 4,063,351 | 12/1977 | Borsuk et al. | 29/881 |
| 4,426,124 | 1/1984 | Vandevier . | |
| 4,445,748 | 5/1984 | Evans | 339/94 M |
| 4,460,227 | 7/1984 | Ball | 339/94 M |
| 4,515,376 | 5/1985 | Okamuro | 29/451 |
| 4,632,482 | 12/1986 | Punako et al. | 339/94 M |

OTHER PUBLICATIONS

BIW Cable Systems, Inc., brochure.

*Primary Examiner*—Gil Weidenfeld
*Assistant Examiner*—David Pirlot
*Attorney, Agent, or Firm*—James E. Bradley

[57] ABSTRACT

A method and apparatus for sealing electrical conductors through a pressure barrier provides high pressure sealing. The apparatus includes a tubular housing with conductor rods which are inserted in the housing, which is then filled with epoxy and allowed to harden. The conductor rods are also insulated. A grommet is press fitted on each end of the housing, by pushing the grommet over installation pins which insert over the conductor rods. A mandrel is used to drive the grommet into compressive contact with the bore of the housing. Once in place, the installation pins are pulled and the mandrel is removed.

3 Claims, 6 Drawing Figures

METHOD AND MEANS FOR SEALING ELECTRICAL CONDUCTOR RODS IN A TUBULAR HOUSING

BACKGROUND OF THE INVENTION

1. Field of the Invention:

This invention relates in general to submersible pump systems, and in particular to an electrical coupling for connecting electrical cables between high and low pressure zones.

2. Description of the Prior Art:

In a typical oil well submersible pump installation, an electrical motor will be located downhole for rotating a centrifugal pump. Electrical conductors extend from the surface to the motor. If the wellhead is under pressure, the conductors must feed through a barrier separating high wellhead pressure from low surface pressure. Also, in some wells, downhole packers will be present. These packers may separate high and low pressure zones. A packer penetrator extends through the packer for interconnecting the electrical cable above and below the packer.

Feed-through mandrels and packer penetrators are available for providing electrical connections between different pressure zones. These devices usually have an insulation material molded around copper conductors and in a tubular housing. The amount of pressure that the prior art type can withstand is not very high, because the elastomeric insulation material tends to pull away from the sidewall during curing due to shrinkage.

SUMMARY OF THE INVENTION

In this invention, rather than molding an elastomeric material in the housing, an elastomeric circular grammet is press fitted into the housing. The conductor rods are coated with an insulation material and suspended in an epoxy within the housing. Installation pins are placed over the conductor rods. Then, the grommet is squeezed and forced into the housing over the installation pins, using a mandrel. The installation pins are then removed, and the mandrel is removed.

BRIEF DESCRIPTION OF THE DRAWINGS

FIG. 6 is a side view of an installation pin removal tool.

DESCRIPTION OF THE PREFERRED EMBODIMENT

Figure 1:
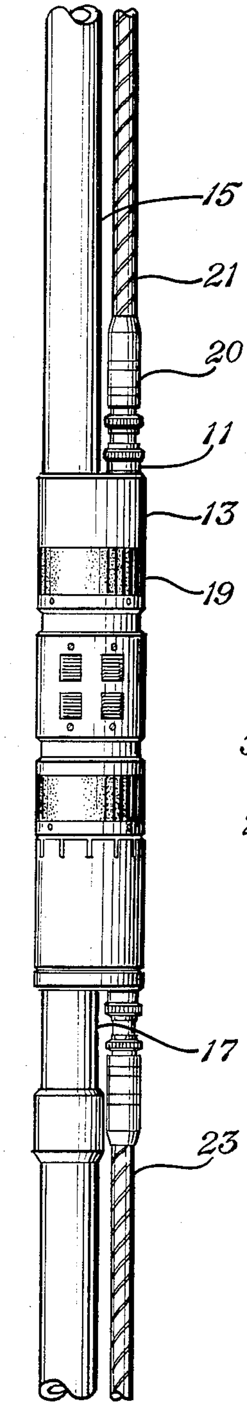
FIG. 1 is a side elevational view of a packer penetrator installed in a packer.

Referring to FIG. 1, a penetrator 11 is shown installed in a packer 13. Packer 13 is of a type that will be installed in an oil well to separate zones in the casing. Packer 13 is connected to an upper string 15 of tubing which extends to the surface. A lower string 17 of tubing extends downwardly. The packer has sealing elements 19 which seal against the casing (not shown) to divide the casing into zones which may have different pressures. Packer 13 is of a conventional type.

The penetrator 11 is connected to an upper section 21 of cable for delivering three phase alternating current power to a submersible pump (not shown). The lower end of the penetrator 11 is connected to a lower cable section 23, which delivers the power to the pump. The penetrator 11 is sealingly carried in the packer 13 so that there will be no leakage of pressure between the upper end and the lower end. The cable sections 21 and 23 are connected to the penetrator 11 by threaded connectors 20.

Figure 2:
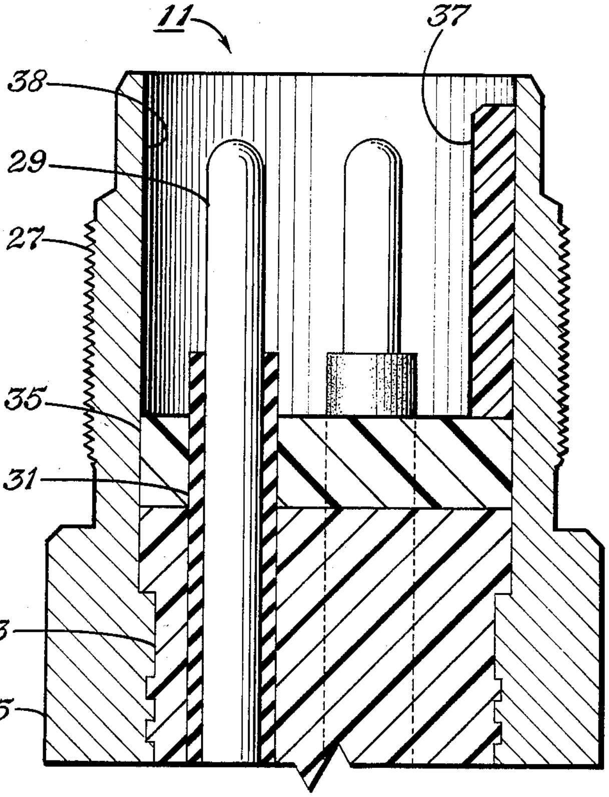
FIG. 2 is an enlarged partial cross-sectional view of the upper portion of the penetrator of FIG. 1.

Referring to FIG. 2, the penetrator 11 has a tubular housing 25 that extends sealingly through the packer 13. Housing 25 has threads 27 on its upper and lower ends for engaging the connectors 20 connected to the cable sections 21 and 23. Three conductor rods 29 (only two shown) extend through the housing 25. Each rod 29 is a solid copper rod for connecting to the conductors in the power cables 21 and 23. Each rod is coated with an insulating layer 31. The insulating layer 31 is preferably an EPDM (ethylene-propylene-diene monomer terpolymer) elastomeric blend such as disclosed in U.S. Pat. Nos. 3,926,900 and 4,472,498. It is molded around the conductor rod 29, and is relatively thin. The material is oil and brine resistant and is permeable to low molecular gases.

The housing 25 is filled with a liquid epoxy 33, which hardens when cured to hold the conductor rods 29 rigidly in place. A grommet 35 is located on each end of the epoxy 33 for sealing the conductor rods 29 in the housing 25. A locator tab 37 is secured by an adhesive to the inner bore 38 of housing 25 at each end for locating the connectors 20 for the cable sections 21 and 23.

Figure 3:
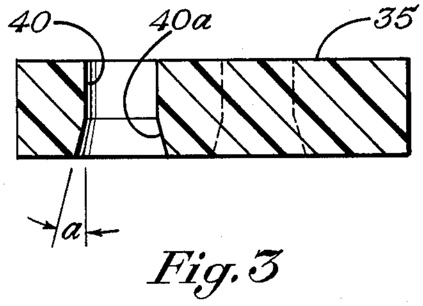
FIG. 3 is a cross-sectional view of the grommet used in the penetrator of FIG. 2, shown removed from the assembly.

Referring to FIG. 3, the grommet 35 is an elastomeric material very similar to the material for the insulating layer 31. It is also an EPDM, however, it differs in that it preferably contains randomly oriented flocked fibers dispersed therein (not shown). The fibers are of a non-thermoplastic material, preferably cellulose, such as described in general in U.S. Pat. No. 3,909,467. The grommet 35 has a hardness that is approximately that of an O-ring seal used for low pressure sealing applications. This hardness is about 71–76 durometer (Shore "A"). Grommet 35 has an outer diameter that is slightly greater than the inner diameter of the bore 38, to provide a compression fit. The difference is approximately that of the squeeze on a conventional O-ring. In one embodiment, the outer diameter of grommet 35 in its natural condition is 1.93 inch while the bore 38 is 1.89 inch. This leaves a difference in diameters of 0.040 inch, and the range is preferably 0.034 to 0.050 inch in diameter difference. In terms of percentage, the grommet 35 diameter is preferably about 1.8% to 2.6% greater in diameter than bore 38.

Grommet 35 has three passages 40 (only two shown), each for tightly receiving one of the conductor rods 29. Each hole 40 has a beveled entrance *40a*, which is frusto-conical, tapering outwardly at an angle a of about 3 degrees. The diameter of the hole 40 is sized slightly smaller than the outer diameter of the insulation layer 31, so as to provide a compressive seal. Preferably, the initial diameter of the passage 41 is about 0.437 inch, while the outer diameter of the insulating layer 31 is about 0.453 inch. The metal portion of the conductor rod 29 is about 0.281 inch. The holes 40 are thus about 0.016 inch smaller in diameter than the insulating layer 31 diameter.

To manufacture the penetrator 11, insulating layers 31 are molded on the three rods 29 and the three rods 29 are positioned in the housing 25. Liquid epoxy is pumped into the bore 38, then allowed to harden. While curing, the epoxy will shrink, pulling away from the wall 38 slightly, thus will not provide an effective seal against pressure. The insulating layer 31 will protrude above and below the epoxy 33 at each end.

Figure 4:
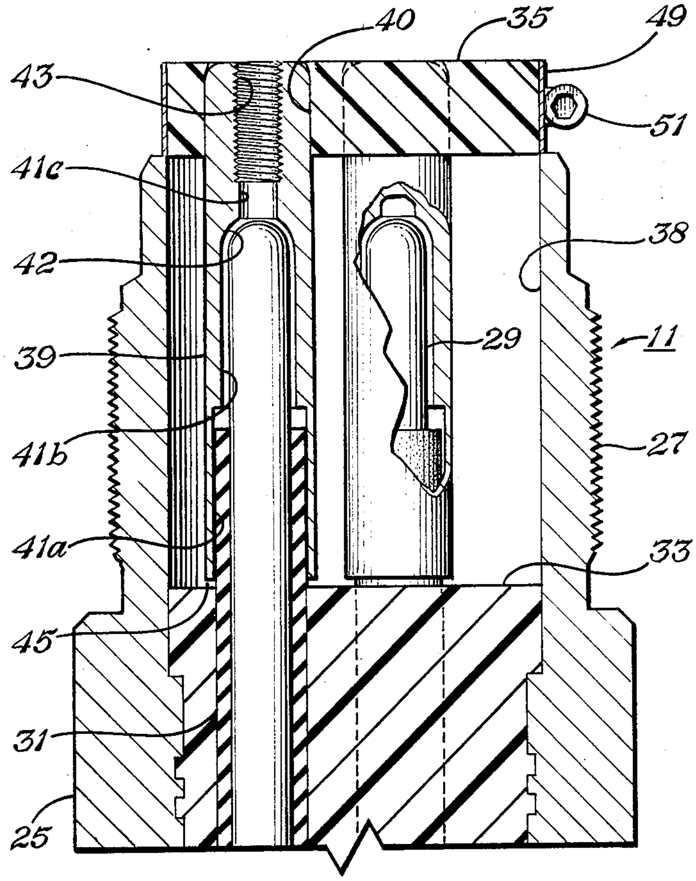
FIG. 4 is a cross-sectional view of the penetrator of FIG. 1, shown with installation pins inserted over the conductor rods, and the grommet being inserted into the housing.

Then, an installation pin 39 is inserted over each conductor rod 29 as shown in FIG. 4. The installation pin 39 is a metal sleeve having a passage through it with a lower section 41*a*, a central section 41*b* and an upper section 41*c*. The lower section 41*a* is sized to slide easily over the insulating layer 31. The inner diameter of the passage section 41*a* is greater in diameter than the insulating layer 31. The central section 41*b* is smaller in diameter than the lower section 41*a*, but larger in diameter than the conductor rod 29. It has an upper shoulder 42 facing downwardly for contacting the top of the conductor rod 29. The upper section 41*c* has threads 43, and it is smaller in diameter than the central section 41*b*. The shoulder 42 is positioned such that when it contacts the top of the rod 29, the lower end of the installation pin 39 will be spaced slightly above the epoxy 33, providing a clearance 45.

After the installation pins 39 are installed, the grommet 35 is placed in a ring clamp 49. Ring clamp 49 is a metal sleeve having a tightening means 51 for constricting its diameter to squeeze the grommet 35 to a smaller diameter. Ring clamp 49 is of a conventional type such as used for installing pistons with piston rings and cylinders. Once the clamp 49 is installed and tightened, the lower edge of the grommet 35 will be inserted into the end of the bore 38.

Figure 5:
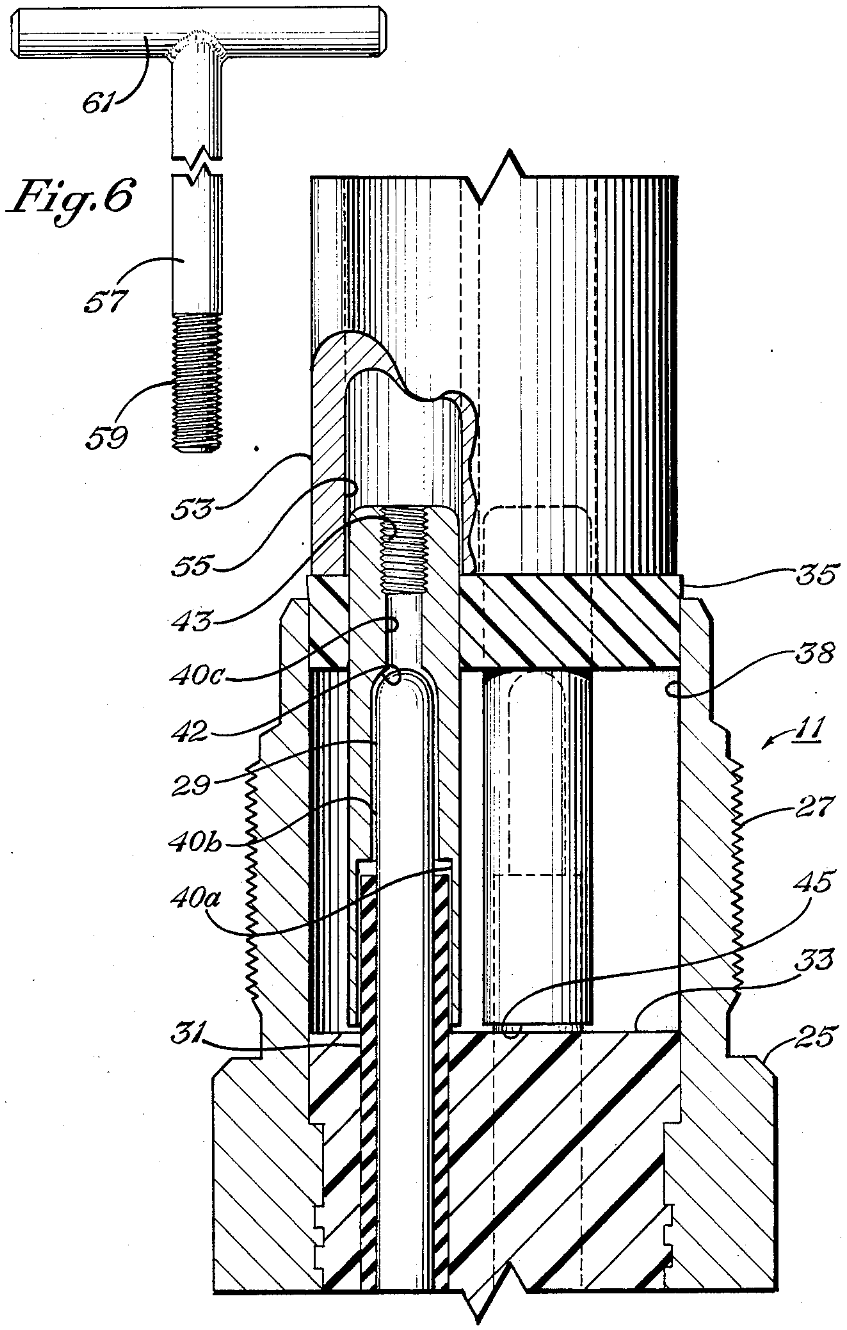
FIG. 5 is a cross-sectional view of the upper portion of the penetrator of FIG. 1, showing the mandrel forcing the grommet into the housing.

Referring now to FIG. 5, once the insertion begins, the ring clamp 49 is removed. Then, a mandrel 53 is placed on top of the grommet 35. Mandrel 53 is a metal cylinder having three passages 55, each positioned to loosely receive one of the installation pins 39. The operator taps the upper end of the mandrel 53 with a mallet, causing the grommet 35 to move downwardly into the bore 38 and seat against the epoxy 33. Air trapped between the grommet 35 and the epoxy 33 will flow through the clearance 45, and through the annular space between the insulating layer 31 and the installation pin passage section 41*a*. The air will flow through the clearance between the conductor rod 29 and the installation pin passage 41*b*. The air flows past the shoulder 42 and out the upper passage section 41*c*. The clearance 45 and the clearances between the conductor rod 29 and the passage sections 41*a* and 41*b* serve as clearance means for allowing trapped air to escape.

Once the grommet 35 is tightly in place in abutment with the epoxy 33, the installation pins 39 can be pulled out. A pin removal tool 57, shown in FIG. 6, is used to remove the installation pins 39. The pin removal tool 57 is a T-shaped bar, with threads 59 on one end. A handle 61 is located on the other end. The pin removal tool 57 is inserted through the passage 55 of the mandrel and the threads 59 are secured into the threads 43, which serve as a ledge for the pin removal tool 57 to grip. While holding the manderel 53 in place to prevent the grommet 35 from pulling upward, the pin removal tool 57 is pulled upwardly, bringing along with it the installation pin 39. Once all of the installation pins 39 are removed, the mandrel 53 can be removed simply by pulling upwardly. The locator tab 37 may be secured in place with an adhesive.

In operation, the penetrator 11 is mounted inside a pressure barrier such as the packer 13. Cable sections 21 and 23 are secured to the threads 27 on each end of the penetrator 11. The connectors 20 have receptacles for sliding over each conductor rod 29 to provide electrical continuity.

The invention has significant advantages. By press fitting the grommet 35 in place, rather than molding, the penetrator is able to withstand greater pressure differential.

While the invention has been shown in only one of its forms, it should be apparent that those skilled in the art that it is not so limited but is susceptible to various changes without departing from the scope of the invention.

I claim:

1. A method of sealing at least one electrical conductor rod inside a tubular housing for connecting an electrical conductor through a pressure barrier structure, comprising in combination:

placing the rod in the housing and injecting epoxy around the central portions of the rod, leaving the opposite ends exposed, and allowing the epoxy to harden; then on each end of the housing, inserting a hollow installation pin over the end of the rod;

providing an elastomeric circular grommet with a tight fitting hole for the conductor rod, and providing the grommet with an outer diameter that is greater than the inner diameter of the housing;

inserting the grommet over the pin, squeezing the grommet, and starting insertion of the grommet into the housing;

placing a mandrel on the grommet, the mandrel having a hole for receiving the pin;

moving the mandrel forwardly to drive the grommet into contact with the hardened epoxy; then removing the installation pin and the mandrel, allowing the grommet to tightly seal around the rod and in the housing.

2. A method of sealing a plurality of electrical conductor rods inside a tubular housing for connecting electrical conductors through a pressure barrier structure, comprising in combination:

placing an insulation layer around the central portions of each conductor rod, leaving the opposite ends exposed;

placing the conductor rods in the housing and injecting epoxy around the central portions of the rods, leaving the opposite ends of the insulation layer and the rods exposed, and allowing the epoxy to harden; then on each end of the housing, inserting an installation pin over each end of each rod and the protruding portion of the installation layer;

providing an elastomeric circular grommet with holes for each conductor rod, each hole being slightly smaller in diameter than the diameter of the rod at the insulation layer, and providing the grommet with an outer diameter that is greater than the inner diameter of the housing;

inserting the grommet over the pins, squeezing the grommet, and starting insertion of the grommet into the housing;

placing a mandrel on the grommet, the mandrel having holes for receiving the pins;

moving the mandrel forwardly to drive the grommet into contact with the hardened epoxy, the insulation pins having clearance means for allowing air trapped between the grommet and epoxy to escape; then removing the installation pins and the mandrel, allowing the grommet to tightly seal around the rods and the housing.

3. A method of sealing a plurality of electrical conductor rods inside a tubular housing for use in a submersible pump installation to connect electrical conductors through a pressure barrier structure, comprising in combination:

placing an insulation layer around the central portions of each conductor rod, leaving the opposite ends exposed;

placing the conductor rods in the housing and injecting epoxy around the central portions of the rods, leaving the opposite ends of the insulation layer and the rods exposed, and allowing the epoxy to harden; then on each end of the housing, providing an installation pin with a passage having a lower section of diameter greater than the insulation layer, a central section of diameter less than the insulation layer and greater than the rod, and an upper section having at least one gripping ledge therein;

inserting one of the installation pins over each end of each rod and the protruding portion of the insulation layer;

providing an elastomeric circular grommet with tight fitting holes for each conductor rod, and providing the grommet with an outer diameter greater than the inner diameter of the housing;

inserting the grommet over the pins, placing a ring clamp around the grommet and squeezing it with the ring clamp, then starting insertion of the grommet into the housing;

placing a mandrel on the grommet, the mandrel having holes for receiving the pins;

moving the mandrel forwardly to drive the grommet into contact with the hardened epoxy, with air trapped between the grommet and the epoxy passing through the lower, central and upper sections of the passage in each of the pins;

inserting a pin removal tool into the upper section of each passage to engage the ledge and pulling upwardly to remove the pin; then removing the mandrel.

* * * * *